June 21, 1955     H. F. KEMPTON     2,711,190
REAGENT FEEDER
Filed May 12, 1951

Inventor
HENRY F. KEMPTON
By Howard T. Sweet
Attorney

United States Patent Office 2,711,190
Patented June 21, 1955

2,711,190

REAGENT FEEDER

Henry F. Kempton, Aurora, Colo.

Application May 12, 1951, Serial No. 226,016

4 Claims. (Cl. 137—561)

This invention relates to devices for the controlled feeding of reagents to metallurgical and analogous processing circuits and has as an object to provide an improved reagent feeder of simple construction and high performance characteristics.

A further object of the invention is to provide a reagent feeder operable to accomplish its intended purposes without direct application of power thereto.

A further object of the invention is to provide an improved reagent feeder susceptible of precise adjustment for exact control of the rate and volume of its output.

A further object of the invention is to provide an improved reagent feeder that is readily adaptable to use with various processing circuits and at any desired point in such circuits.

A further object of the invention is to provide an improved reagent feeder that is simple and inexpensive of construction in any desired size and capacity, that is adjustable in any given size to vary the rate and volume of its output throughout an extensive range, that is automatic and accurate in operation, and that is efficient in attainment of the ends to which it is applicable.

With the foregoing and other objects in view, my invention consists in the construction, arrangement, and combination of elements as hereinafter set forth, pointed out in my claims, and illustrated by the accompanying drawing, in which—

Figure 1:
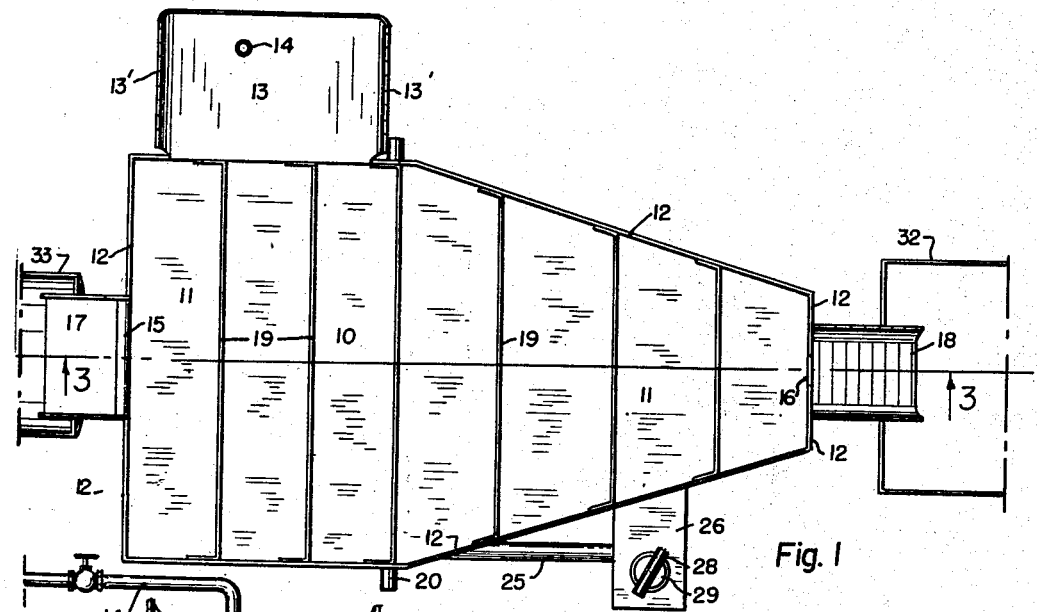
Figure 2:
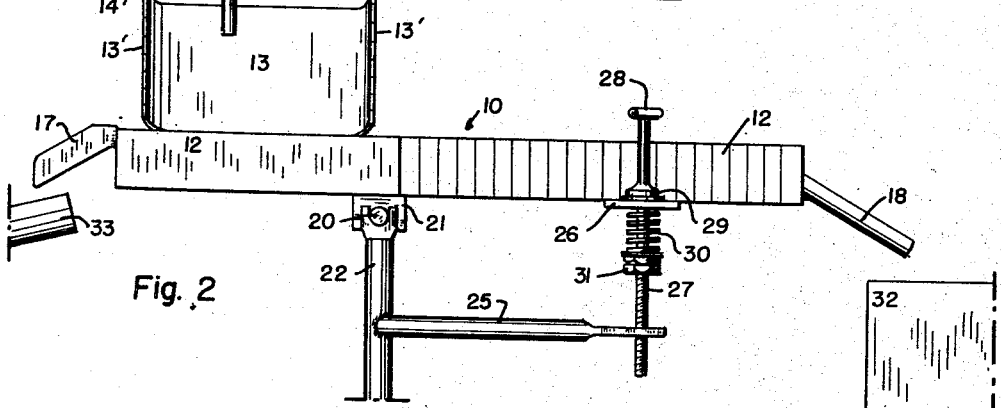
Figure 3:
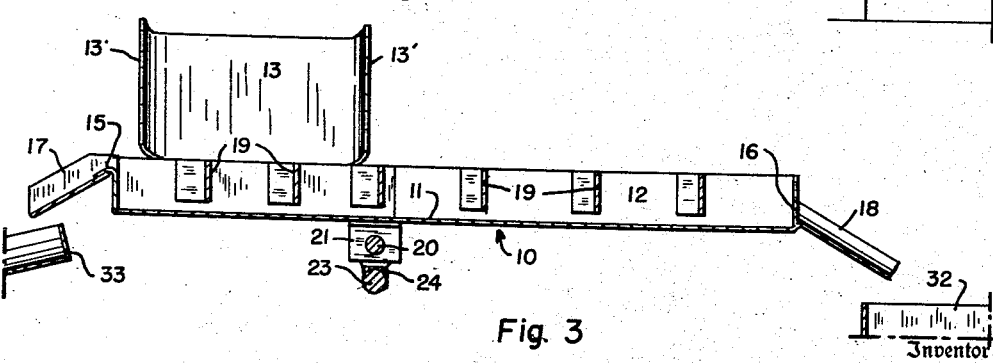

Figure 1 is a top plan view of a typical embodiment of the invention as arranged ready for practical use. Figure 2 is a side elevation of the organization according to Figure 1. Figure 3 is a vertical section longitudinally of the organization shown in the preceding views taken substantially on the indicated line 3—3 of Figure 1.

In various processing operations, metallurgical and other, it is the practice to supply reagents to particular points of the processing circuits. The reagents may be either wet or dry and vary widely in their nature and degree of concentration, but a very extensively practiced processing technique requires the infeed of highly concentrated liquid reagents to the processing circuit in relative minute quantities, and it is to the provision of improved means for feeding small quantities of such highly concentrated liquid reagents that the instant invention is directed.

As shown in the drawing, a shallow tray 10 is formed of suitable material resistant to the corrosive action of the reagent to be fed therethrough and is constructed in any desired size and capacity to present a smooth, flat, bottom plate 11 rectangular at one end and symmetrically tapered at its sides from said rectangular end and to a narrower, truncated, other end, and side walls 12 perpendicularly upstanding from and continuously about the margins of said plate 11. At one side of the relatively wider, rectangular end of said tray, a deflector plate 13, provided with upstanding marginal flanges 13', is fixed to the upper margin of a side wall 12 and inclines thence upwardly and outwardly to receive solution supplied through a valved line 14 and direct such solution to the interior of the tray. At the wider end of the tray, the side wall 12 is notched to form an outflow lip 15 well above the plane of the bottom plate 11 and of considerable length in a direction transversely of the tray and parallel to said bottom plate, while at the tray narrow end the side wall 12 is more narrowly and more deeply notched to provide an outflow lip 16 closer to the bottom plate 11 than the lip 15, parallel to said bottom plate, and of much less extent transversely of the tray than said lip 15. A shallow, open spout 17 is fixed to the wider end of the tray in position to receive and direct outflow passing over the lip 15 and a similar spout 18 is associated with and to receive and direct outflow over the lip 16, both of the spouts 17 and 18 inclining outwardly and downwardly from the lips wherewith they are respectively associated so as to permit gravity flow of liquid therein and away from the tray. Completing the tray 10, a series of like baffles 19 is fixed to bridge in spaced, parallel relation transversely of the tray interior and between the tray side walls 12 in substantial parallelism with the side wall portions at the ends of the tray. The baffles 19 are hence substantially perpendicular to the tray bottom plate 11 and are similarly spaced at their lower margins above said plate, whereby to accommodate movement of solution within the tray and beneath said baffles for maintenance of a common liquid level in the tray, the top margins of the baffles 19 lying well above the plane common to the lips 15 and 16 and conveniently merging into the plane of the side wall 12 upper edges.

The tray 10 constituted as shown and described is mounted in any desired position of use for arcuate adjustment in the vertical plane about an axis beneath, spacedly parallel to, and transversely of the tray bottom plate 11, such an axis being conveniently provided in the form of a straight, cylindrical member 20 fixedly engaging through ears 21 secured to and depending from the tray bottom, plate 11 inwardly adjacent the tray outer side walls near the junction of the tray rectangular end with the tapered tray portion. To mount the tray in position of use, a rigid standard 22 upstands fixedly and vertically from any suitable support, such as a portable base, and is forked at its upper end to receive and rotatably accommodate one end of the member 20, and a bracket arm 23 is fixed at one end to and projects perpendicularly from the standard 22 in clearing relation beneath the ears 21 and terminates at its other end in a forked, upward extension 24 disposed to receive and rotatably accommodate the other end of said member 20, the disposition of the bracket arm 23 being such as to relate its forked extension 24 with the similar forked end of the standard 22 in a manner to support the member 20 with its axis horizontal. As so mounted through engagement of the member 20 ends in the forks of the standard 22 and bracket arm extension 24, the tray 10 is disposed with its bottom plate 11 transversely horizontal and supported for adjustment in a vertical arc about the axis of the member 20.

Regulation and adjustment of the tray 10 attitude about its mounting axis for determination of the rate and volume of reagent feed over the outflow lip 16 is provided in the form of selective-adjustable means interconnecting the tray and a member in fixed relation with the standard 22, one such arrangement suitable for the purpose being illustrated as comprising an arm 25 fixedly outstanding from the standard 22 beneath and forwardly along one side of the tray 10 position, a lug 26 fixedly outstanding laterally from a tray 10 forward portion to spacedly overhang the free end of the arm 25, and a stem 27 rotatably traversing the lug 26 and threadedly engaging with and through the free end of the arm 25. The end of the stem 27 above the lug 26 is furnished with a handle 28 whereby the stem may be rotated, an annular flange 29 formed on said stem is positioned to engage the upper surface of the lug 26 and limit axial displacement of the stem 27 relative to said lug in one direction, and an expansive coil spring 30 surrounds the stem 27 beneath the lug 26 in end-bearing relation between said lug and nuts 31 threadedly cooperating with the stem 27 above the arm 25, so that pressure of the spring 30 functions to hold the lug 26 against the flange 29 at the upper limit of its elevation relative to the arm 25 as determined by stem 27 threaded adjustment in and through said arm. Obviously, altitudinal adjustment of the lug 26 through the agency of the threaded stem 27 is reflected as corresponding altitudinal adjustment of the tray 10 forward end about the tray mounting axis, thus to determine a desired attitude of said tray relative to a horizontal plane through the member 20 axis.

In the operation of the improvement the tray 10 is installed with and upon its mounting as shown and described in position for delivery of solution through the spout 18 to a processing cell, or equivalent unit, 32 and in position to receive reagent solution delivered through the valved line 14 upon its inclined plate 13, and a return flow trough or conduit 33 is arranged to receive solution outflow from the tray through a spout 17 and direct such outflow as may be desired, preferably to return to the reagent solution supply served by the line 14. The valve of the line 14 is manipulated to serve the tray with reagent solution and is then adjusted to a rate of supply to the tray somewhat greater than the required reagent feed to the processing circuit, and the stem 27 is then manipulated to bring the outflow lips 15 and 16 of the tray into approximate registration with a true horizontal plane, easily determined by reference to the solution level within the tray, and such manipulation of the stem 27 is availed of to locate the narrower and lower outflow lip 16 beneath the level of the outflow lip 15 sufficiently to establish and maintain delivery of reagent solution from the tray 10 and through the spout 18 to the cell 32 in an amount and at a rate determined to be appropriate, the supply of solution to the tray in excess of that required for the desired feed to the processing circuit resulting in an elevation of solution level within the tray and consequent discharge of the excess solution over the lip 15 and away from the feeder; the baffles 19 functioning to minimize surging of solution within the tray while permitting the solution to find and maintain a uniform surface level.

As is readily apparent, the improved feeder permits precise regulation of reagent supply to a processing circuit without occasion for close regulation of solution delivery from a supply and to the feeder, thereby facilitating practical control of reagent feed at any desired point of the circuit.

Since changes, variations, and modifications, in the form, construction and arrangement of the elements shown and described may be had without departing from the spirit of my invention, I wish to be understood as to being limited solely by the scope of the appended claims, rather than by any details of the illustrative showing and foregoing description.

I claim as my invention:

1. A reagent feeder comprising a shallow tray formed with a flat bottom and side walls marginally upstanding therefrom, side wall portions at the ends of the tray being parallel to each other and perpendicular to the length of the tray, a notch shallowly interrupting the side wall portion at one end of the tray to define a wide outflow lip parallel to and well above the tray bottom, a notch deeply interrupting the side wall portion at the other end of the tray to define a narrow outflow lip parallel to and slightly above the tray bottom, baffles transversely of said tray and intersecting the plane common to said outflow lips with the baffle lower margins spaced from the tray bottom, outwardly and downwardly inclined spouts associated with said outflow lips exteriorly of the tray for the direction of overflow from the lips, means hingedly supporting said tray to rock through a vertical arc about an axis transversely paralleling the tray bottom, means for adjustably determining the tilt of the tray about said axis, and means for the continuous supply of reagent solution to the tray.

2. A reagent feeder comprising a shallow tray formed with a flat bottom and side walls marginally upstanding therefrom, side wall portions at the ends of the tray being parallel to each other and perpendicular to the length of the tray, a notch shallowly interrupting the side wall portion at one end of the tray to define a wide outflow lip parallel to and well above the tray bottom, a notch deeply interrupting the side wall portion at the other end of the tray to define a narrow outflow lip parallel to and slightly above the tray bottom, baffles spaced apart transversely of the tray and intersecting the plane common to said outflow lips with the baffle lower margins spaced from the tray bottom, outwardly and downwardly inclined spouts associated with said outflow lips exteriorly of the tray for the direction of overflow from the lips, an axis member fixed transversely beneath and to spacedly parallel the tray bottom, an upright standard, a yoked upper end on said standard adapted to rotatably receive the ends of said axis member and support said member in a horizontal disposition, whereby to mount said tray to rock through a vertical arc about a horizontal axis between and paralleling the notched end portions of the tray side walls, means for adjustably determining the tilt of the tray about said axis, and means for the continuous supply of reagent solution to the tray.

3. The organization according to claim 2, wherein the means for adjustably determining the tilt of the tray about the axis of its mounting comprises an arm fixedly outstanding from said standard below and in a direction perpendicular to the vertical plane containing the tray axis member, a lug fixed to and projecting laterally from the tray in spacedly-overhanging relation with the free end of said arm, a stem threadedly engaging the arm free end and loosely traversing said lug, a manipulating handle on said stem, an annular flange carried by said stem in bearing engagement against the upper side of the lug, nuts adjustable along said stem between the arm and lug, and an expansive coil spring about said stem in end-bearing engagement between said nuts and the adjacent side of the lug.

4. The organization according to claim 2, wherein the means for supplying reagent solution to the tray comprises a valved flow line leading from a supply of reagent solution remote from the feeder and disposed for delivery adjacent one side of said tray, and a deflector plate fixedly outstanding laterally from a tray side wall upper margin at an upward and outward inclination from the tray and beneath the delivery outlet of said line.

References Cited in the file of this patent

UNITED STATES PATENTS

| 35,880 | Low | July 15, 1862 |
| 897,940 | Van Gundy | Sept. 8, 1908 |
| 2,368,065 | Hyatt | Jan. 23, 1945 |